(12) United States Patent
Kelland

(10) Patent No.: US 6,870,947 B2
(45) Date of Patent: Mar. 22, 2005

(54) METHOD OF PROCESSING ITEMS IN A CHECK PROCESSING SYSTEM AND AN APPARATUS THEREFOR

(75) Inventor: Stewart B. Kelland, Waterloo (CA)

(73) Assignee: NCR Corporation, Dayton, OH (US)

( * ) Notice: Subject to any disclaimer, the term of this patent is extended or adjusted under 35 U.S.C. 154(b) by 674 days.

(21) Appl. No.: 09/911,664

(22) Filed: Jul. 24, 2001

(65) Prior Publication Data

US 2003/0021460 A1 Jan. 30, 2003

(51) Int. Cl.[7] ................................................ G06K 9/00
(52) U.S. Cl. ...................... 382/137; 382/181; 705/45; 235/379
(58) Field of Search .......................... 382/137, 175, 382/176, 181, 187, 138, 198, 177, 179, 186, 182, 209, 229, 231, 305, 306, 321; 705/45, 43, 75; 235/379; 707/6

(56) References Cited

U.S. PATENT DOCUMENTS

| | | | | |
|---|---|---|---|---|
| 4,734,859 A | * | 3/1988 | Hamaguchi et al. | 705/43 |
| 5,151,948 A | * | 9/1992 | Lyke et al. | 382/138 |
| 5,819,265 A | * | 10/1998 | Ravin et al. | 707/5 |
| 5,850,480 A | * | 12/1998 | Scanlon | 382/229 |
| 6,047,093 A | * | 4/2000 | Lopresti et al. | 382/310 |
| 6,259,812 B1 | * | 7/2001 | Mao et al. | 382/186 |
| 6,385,582 B1 | * | 5/2002 | Iwata | 704/270 |
| 6,678,427 B1 | * | 1/2004 | Kamimura | 382/306 |
| 2001/0033694 A1 | * | 10/2001 | Goodman et al. | 382/229 |
| 2003/0023557 A1 | * | 1/2003 | Moore | 705/50 |
| 2003/0089768 A1 | * | 5/2003 | Page | 235/379 |
| 2004/0165748 A1 | * | 8/2004 | Bonner et al. | 382/101 |

* cited by examiner

Primary Examiner—Bhavesh M. Mehta
Assistant Examiner—Barry Choobin
(74) Attorney, Agent, or Firm—Michael Chan

(57) ABSTRACT

A method of processing a deposit slip item in a check processing system comprises the steps of (a) capturing an image of the deposit slip item, (b) extracting account owner data from the captured image of step (a), (c) recognizing an account owner name from the extracted account owner data of step (b), and (d) storing the recognized account owner name of step (c) in memory to provide a lexicon against which extracted payee data from a check item can be compared. The method may further comprise the steps of (e) generating a number of equivalent account owner names based upon the extracted account owner data of step (b), and (f) storing the equivalent account owner names of step (e) in memory to provide other lexicons against which extracted payee data from a check item can be compared.

18 Claims, 8 Drawing Sheets

FIG. 3

Deposit Ticket

James C. Morrison
1765 Sheridan Dr.
Your City, State 11096

Date

⑈031023246⑈ 9876543⑆2⑈

METHOD OF PROCESSING ITEMS IN A CHECK PROCESSING SYSTEM AND AN APPARATUS THEREFOR

BACKGROUND OF THE INVENTION

The present invention relates to item processing, and is particularly directed to a method of processing items in a check processing system and an apparatus therefor.

A typical check has a number of fields including a courtesy amount field, a legal amount field, a payor field, a payee field, a date field, and a signature field. The check may be of the personal type or of the business type. A known way to extract data from the check is to use a combination of image processing techniques and recognition techniques. The check is typically moved past an image processing device such as a scanner to obtain a digitized image of the check. The digitized image of the check is then stored in memory.

Data contained in the courtesy amount field or data contained in the legal amount field is usually recognized from the digitized image of the check. More specifically, handwritten or machine-printed characters contained in the courtesy amount field or the legal amount field is located prior to being subjected to a handwriting or character recognition engine at a subsequent operation. The recognition engine applies recognition techniques to the located characters to establish the amount of the check.

Data contained in other fields of the check is sometimes recognized from the digitized image of the check. For example, characters contained in the payee field of the check may be located and subsequently recognized. From time to time, handwritten characters contained in the payee field of the check may be difficult, if not impossible, for the recognition engine to recognize. It would be desirable to improve recognition of characters contained in the payee field of the check, especially when the characters are handwritten and are more difficult for the recognition engine to recognize.

SUMMARY OF THE INVENTION

In accordance with one aspect of the present invention, a method of processing a non-check item in a check processing system comprises the steps of (a) capturing an image of the non-check item, (b) extracting text data from the captured image of step (a), recognizing a name from the extracted text data of step (b), and (d) storing the recognized name of step (c) in memory to provide a lexicon against which extracted text data from a check item can be compared. The non-check item may comprise a deposit slip item. The text data extracted from the captured image of the non-check item may comprise account owner data, and the name recognized from the account owner data may comprise an account owner name. The method may further comprise the steps of (e) generating a number of equivalent account owner names based upon the extracted account owner data of step (b), and (f) storing the equivalent account owner names of step (e) in memory to provide other lexicons against which extracted text data from a check item can be compared.

In accordance with another aspect of the present invention, a method of processing a deposit slip item in a check processing system comprises the steps of (a) capturing an image of the deposit slip item, (b) extracting account owner data from the captured image of step (a), (c) recognizing an account owner name from the extracted account owner data of step (b), and (d) storing the recognized account owner name of step (c) in memory to provide a lexicon against which extracted payee data from a check item can be compared. The method may further comprise the steps of (e) generating a number of equivalent account owner names based upon the extracted account owner data of step (b), and (f) storing the equivalent account owner names of step (e) in memory to provide other lexicons against which extracted payee data from a check item can be compared.

In accordance with yet another aspect of the present invention, a check processing apparatus comprises means for capturing an image of the non-check item, means for extracting text data from the captured image, means for recognizing a name from the extracted text data from the captured image of the non-check item, and means for storing the recognized name of in memory to provide a lexicon against which extracted text data from a check item can be compared. The non-check item may comprise a deposit slip item. The text data extracted from the captured image of the non-check item may comprise account owner data, and the name recognized from the account owner data may comprise an account owner name. The check processing apparatus may further comprise means for generating a number of equivalent account owner names based upon the extracted account owner data from the captured image of the non-check item, and means for storing the equivalent account owner names in memory to provide other lexicons against which extracted text data from a check item can be compared.

In accordance with still another aspect of the present invention, a check processing apparatus comprises means for capturing an image of a deposit slip item, means for extracting account owner data from the captured image of the deposit slip item, means for recognizing an account owner name from the extracted account owner data from the captured image of the deposit slip item, and means for storing the recognized account owner name in memory to provide a lexicon against which extracted payee data from a check item can be compared. The check processing apparatus may further comprise means for generating a number of equivalent account owner names based upon the extracted account owner data from the captured image of the deposit slip item, and means for storing the equivalent account owner names in memory to provide other lexicons against which extracted payee data from a check item can be compared.

In accordance with yet another aspect of the present invention, a program storage medium is readable by a computer having a memory. The medium tangibly embodies one or more programs of instructions executable by the computer to perform method steps for processing a non-check item in a check processing system. The method comprises the steps of (a) capturing an image of the non-check item, (b) extracting text data from the captured image of step (a), (c) recognizing a name from the extracted text data of step (b), and (d) storing the recognized name of step (c) in memory to provide a lexicon against which extracted text data from a check item can be compared. The non-check item may comprise a deposit slip item. The text data extracted from the captured image of the non-check item may comprise account owner data, and the name recognized from the account owner data may comprise an account owner name. The method may further comprise the steps of (e) generating a number of equivalent account owner names based upon the extracted account owner data of step (b), and (f) storing the equivalent account owner names of step (e) in memory to provide other lexicons against which extracted text data from a check item can be compared.

In accordance with still another aspect of the present invention, a program storage medium is readable by a computer having a memory. The medium tangibly embodies one or more programs of instructions executable by the computer to perform method steps for processing a deposit slip item in a check processing system. The method comprises the steps of (a) capturing an image of the deposit slip item, (b) extracting account owner data from the captured image of step (a), (c) recognizing an account owner name from the extracted account owner data of step (b), and (d) storing the recognized account owner name of step (c) in memory to provide a lexicon against which extracted payee data from a check item can be compared. The method may further comprise the steps of (e) generating a number of equivalent account owner names based upon the extracted account owner data of step (b), and (f) storing the equivalent account owner names of step (e) in memory to provide other lexicons against which extracted payee data from a check item can be compared.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is an image of a typical deposit slip item which may be processed in accordance with the present invention;

DETAILS OF THE INVENTION

The present invention is directed to a method of processing items in a check processing system and an apparatus therefor. The check may be of any type, such as a check of the personal type or a check of the business type.

Figure 1:
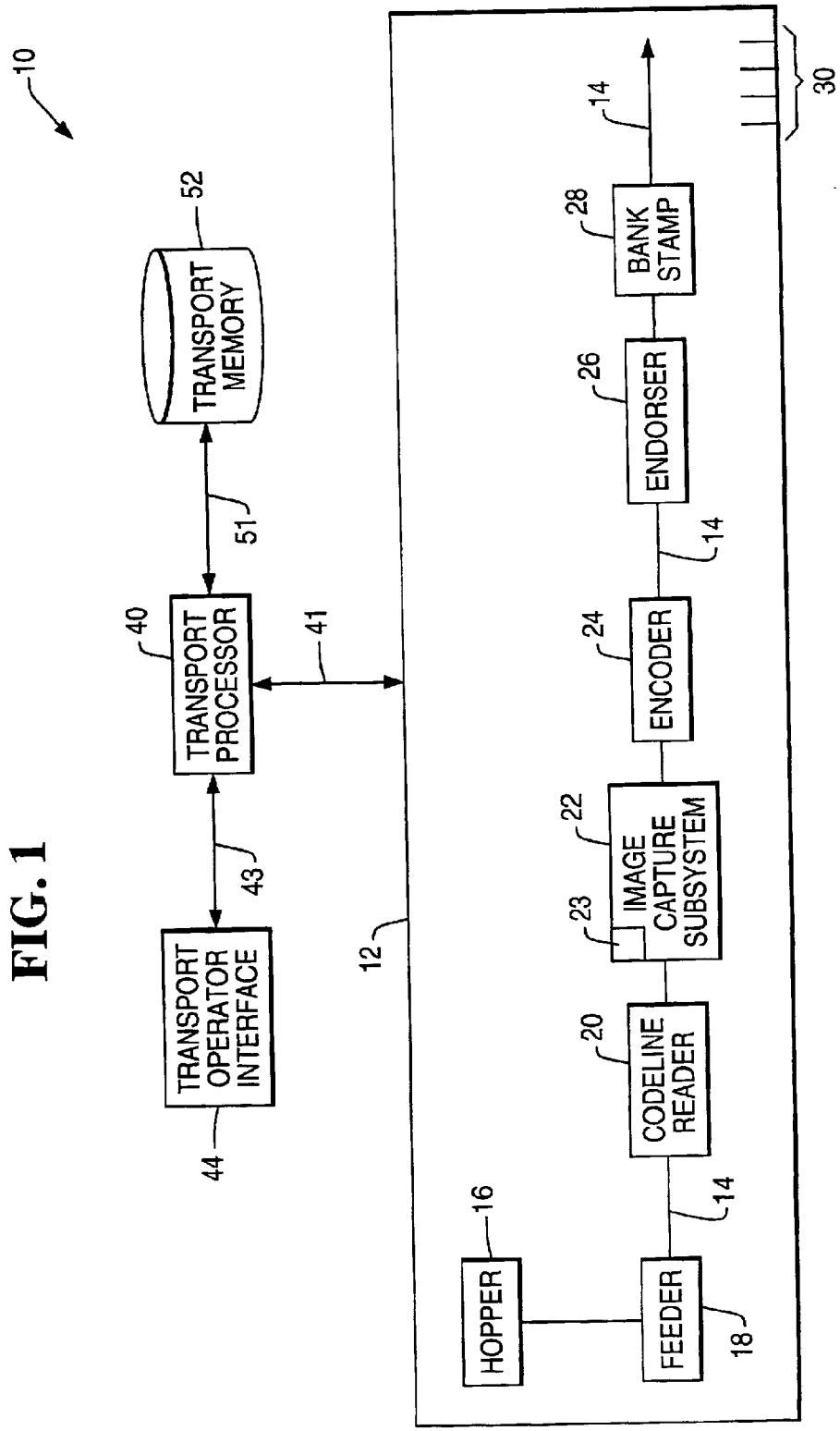
FIG. 1 is a schematic block diagram representation of an image-based check processing system which embodies the present invention.

Referring to FIG. 1, an image-based check processing system 10 includes a check processing transport 12 at which images of checks are captured. The transport 12 has a document track which defines a document transport path 14 along which financial documents, such as checks, can be transported from an upstream end to a downstream end. The transport 12 includes a number of different hardware devices lying along the document transport path 14 for performing specific document processing operations on documents moving along the document transport path 14. The transport 12 includes a hopper 16 into which a stack of financial documents including checks are placed. A document feeder 18 adjacent the hopper 16 selectively feeds or drives each document from the stack of documents in the hopper to transport the document from the upstream end to the downstream end along the document transport path 14 to sorting bins 30 located at the end of the document transport path.

The check processing system 10 further includes a codeline reader 20 such as a MICR reader located along the document transport path 14. The MICR reader 20 reads a MICR codeline from each check being processed in a known manner. Alternatively, the codeline reader may be an OCR reader instead of a MICR reader depending upon on the particular application.

The check processing system 10 further includes an image capture subsystem 22 located along the document transport path 14. The image capture subsystem 22 captures an image of each document for a number of different purposes well known in the financial industry. More specifically, the image capture subsystem 22 includes a scanner 23 which is controlled to capture images of documents moving along the document transport path 14. Scanners for lifting images of checks at the check processing transport 16 are readily available in the marketplace. Their structure and operation are well known and, therefore, will not be described.

The scanner 23 lifts an image of a check as the check moves past the scanner. In particular, the scanner 23 produces pixels each pixel having a particular gray level associated therewith. The gray level of each pixel is thresholded in a known manner to provide binarized image data. Accordingly, check image data associated with a particular check is initially captured at the check processing transport 16 and is then processed to provide binarized image data. The process of capturing an image of a check and providing binarized image data is known and, therefore, will not be described. The binarized image data associated with all of the pixels form a binarized image of the particular check.

Although the above description describes obtaining binarized image data to form a binarized image of the particular check, it is contemplated that gray scale image data may be obtained to form a gray scale image of the particular check. Alternatively, color image data may be obtained to form a color image of the particular check. Any of these types of check images may be processed in accordance with the present invention. For simplicity, only binarized images of checks will be discussed hereinafter.

An encoder 24 encodes missing fields on each check. An endorser 26 applies an endorsement in a known manner to each check. A bank stamp 28 stamps each check to identify the bank institution processing the check. The structure and operation of MICR readers, OCR readers, imaging cameras, encoders, endorsers, and bank stamps are well known and, therefore, will not be described.

Figure 2:
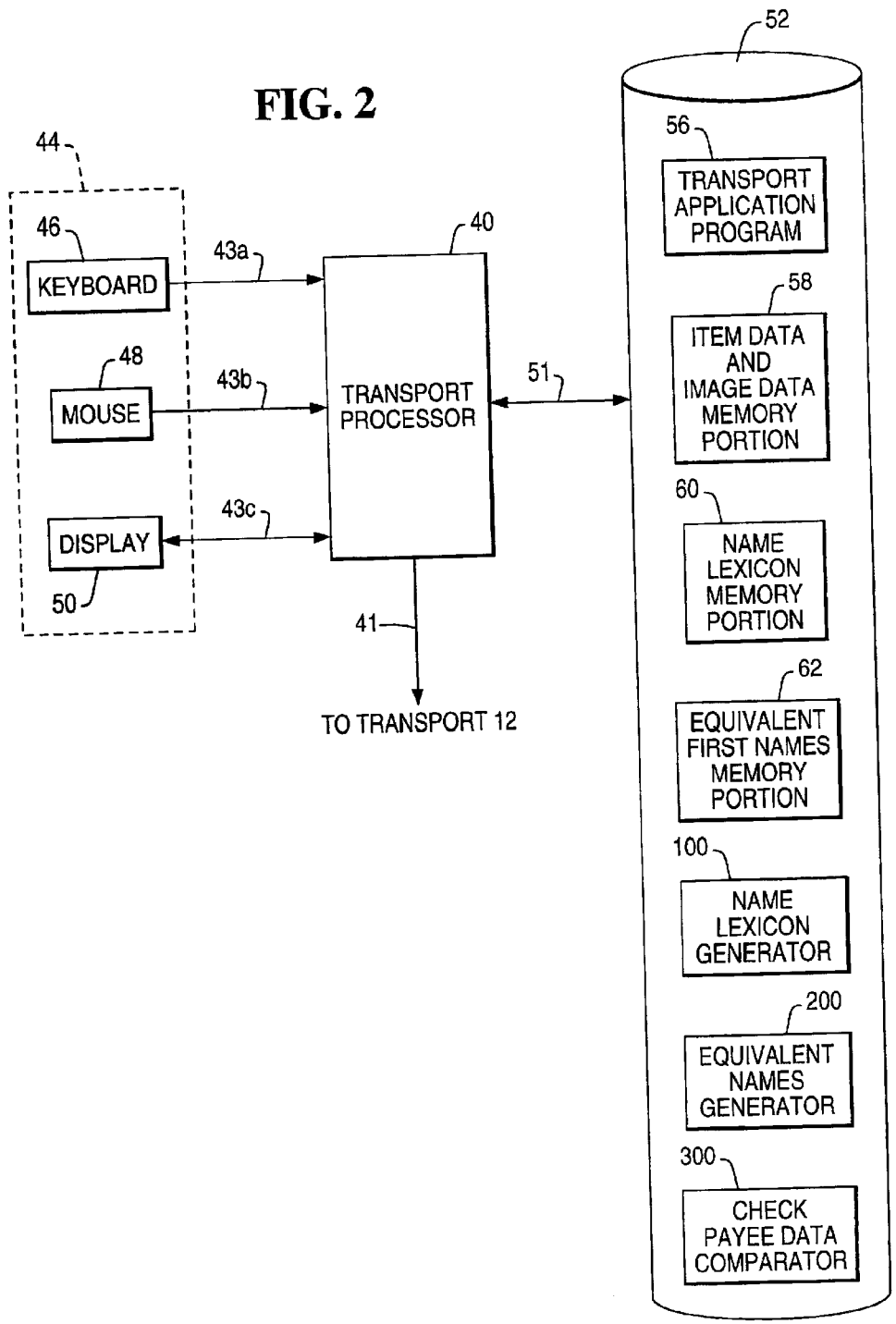
FIG. 2 is a schematic block representation of a portion of FIG. 1.

Referring to FIGS. 1 and 2, the check processing system 10 further includes a transport processor 40 and a transport operator interface 44 which communicates via signals on line 43 (FIG. 1) with the transport processor 40. The transport operator interface 44 includes a keyboard 46, a mouse 48, and a display 50, all of which communicate via signals on lines 43a, 43b, 43c (FIG. 2) with the transport processor 40. The transport processor 40 controls operation of the transport 12 via signals on line 41. The transport operator interface 44 allows a transport operator to control operation of the transport processor 40 and thereby to control operation of the transport 12. Suitable microcomputers and memories are readily available in the marketplace. Their structure and operation are well known and, therefore, will not be described.

The check processing system 10 also includes a transport memory 52 which communicates via signals on line 51 with the transport processor 40. It is contemplated that the transport memory 52 could be a single memory unit or a plurality of different memory units. An executable transport application program 56 is stored in the transport memory 52. The transport application program 56 is associated with a particular type of document processing work. For example, one type of work is proof-of-deposit. Another type of work is remittance processing. Still another type of work may be sorting of items. When the transport application program 56 is executed, the hardware devices lying along the document transport path 14 are controlled to process items moving downstream along the document transport path 14 in accordance with the transport application program, as is known. It should be apparent that the type of work being described herein is a proof-of-deposit application.

The transport memory 52 includes an item data and image data memory portion 58 which stores sequence numbers, MICR codelines, image data such as the binarized image data described hereinabove, encoder status, endorsement status, and bank stamp status associated with transaction items which have been processed in accordance with the transport application program 56. The transport memory 52 further includes a name lexicon generator 100, an equivalent names generator 200, and a check payee name comparator 300. Each of the name lexicon generator 100, the equivalent names generator 200, and the check payee data comparator 300 will be described in detail later.

In a proof-of-deposit application, a number of different types of document items other than checks are usually processed. For example, one type of document item processed in a proof-of-deposit application is a deposit slip item. Different formats of deposit slip items may be processed in accordance with the present invention. A typical deposit slip item 70 is shown in FIG. 3. The deposit slip item 70 has an account owner field 72 which contains account owner data. The process of capturing an image of the deposit slip item 70 and providing binarized image data associated therewith is the same as that already described hereinabove with respect to capturing an image of the check and providing binarized image data associated therewith and, therefore, will not be described.

Figure 4:
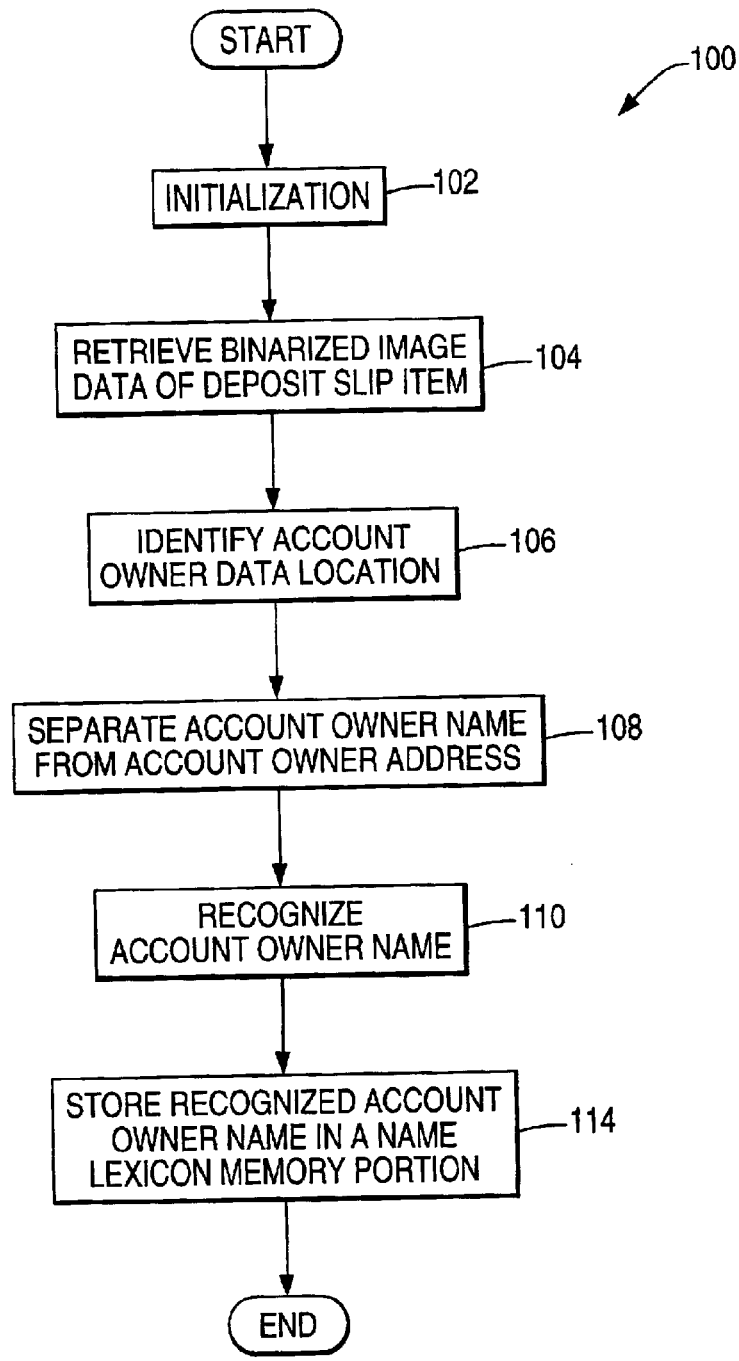
FIG. 4 is a flowchart depicting a program for processing image data associated with the deposit slip item of FIG. 3.

Referring to FIG. 4, a flowchart depicts steps of the name lexicon generator 100 for processing binarized image data associated with the deposit slip item 70 of FIG. 3 to extract account owner data from the account owner field 72. After program initialization as shown in step 102, the program proceeds to step 104 in which binarized image data associated with the deposit slip item 70 is retrieved from the memory portion 58. The program then proceeds to step 106 in which the exact location of account owner data contained in the account owner field 72 is identified for further processing.

After account owner data contained in the account owner field 72 has been located in step 106, the program proceeds to step 108 in which the account owner name and the account owner address contained in the account owner field 72 are separated apart from each other. Parsing techniques may be used to separate the account owner name and the account owner address. A number of parsing techniques is well known and, therefore, will not be described.

The program then proceeds to step 110 in which account owner data associated with the account owner name contained in the account owner field 72 of the deposit slip item 70 is subjected to a machine-print character recognition engine to establish the account owner name. There are many machine-print character recognition engines available in the marketplace which can be used to establish the account owner name and, therefore, will not be described. The program then proceeds to step 112 in which the account owner name established from step 110 is stored in a name lexicon memory portion 60, as shown in FIG. 2.

Figure 5:
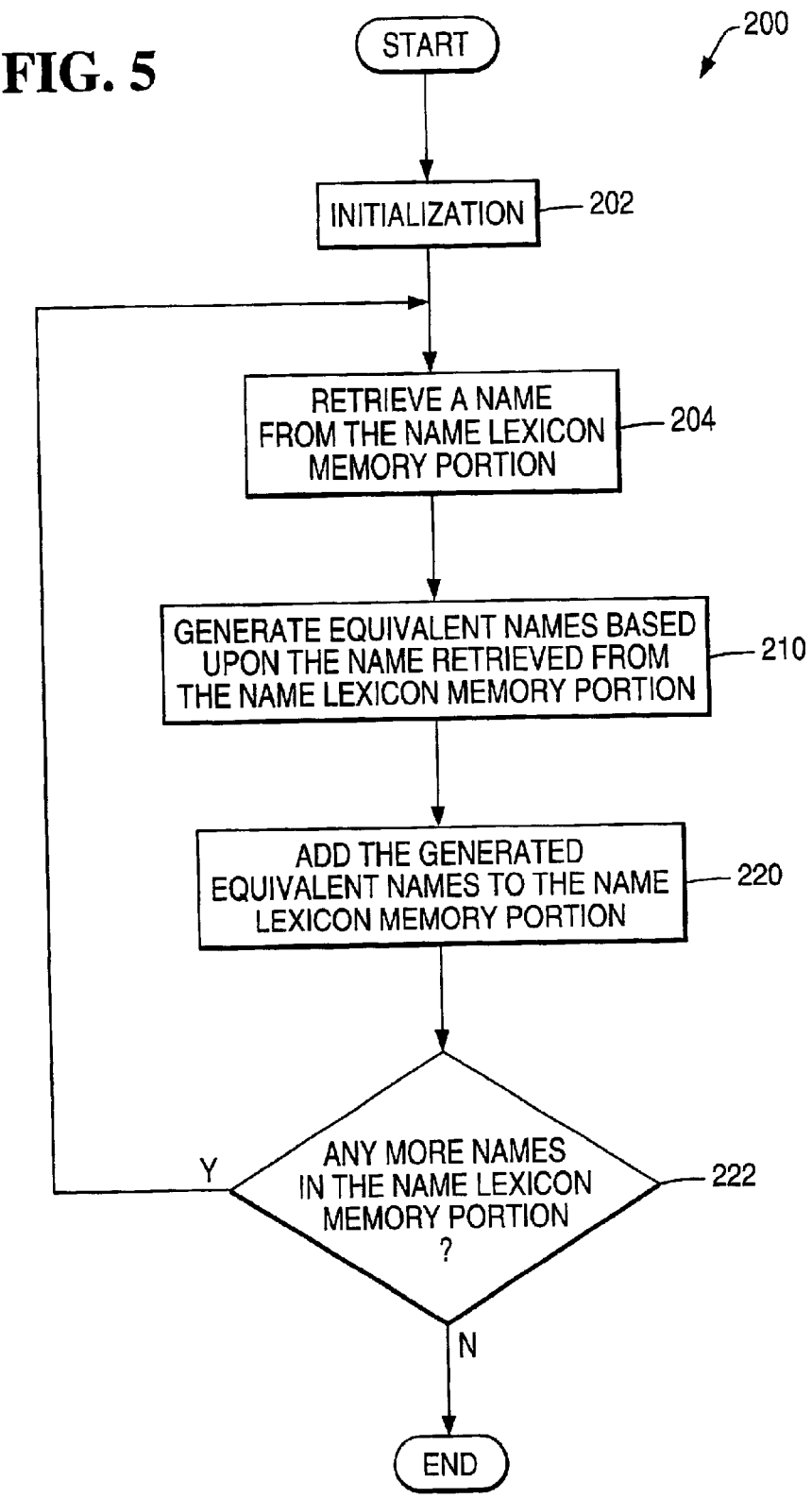
FIG. 5 is an overview flowchart depicting a program for generating a number of equivalent names based upon a name contained in a name lexicon memory portion associated with the deposit slip item of FIG. 3.

Referring to FIG. 5, a flowchart depicts steps of the equivalent names generator 200 for processing account owner data associated with the account owner name contained in the account owner field 72 of the deposit slip item 70 of FIG. 3 to create a number of equivalent names associated with the account owner name. After program initialization as shown in step 202, the program proceeds to step 204 in which a name is retrieved from the name lexicon memory portion 60. Then, in step 210, a number of equivalent names is generated based upon the particular name which was retrieved in step 204 from the name lexicon memory portion 60. The generated equivalent names from step 210 are added to the name lexicon memory portion 60, as shown in step 220.

The program then proceeds to step 222 in which a determination is made as to whether there are any more names contained in the name lexicon memory portion 60 which need to be examined. If the determination in step 222 is affirmative, the program loops back to step 204 to retrieve the next name from the name lexicon memory portion 60. However, if the determination in step 222 is negative, the program terminates.

Figure 6:
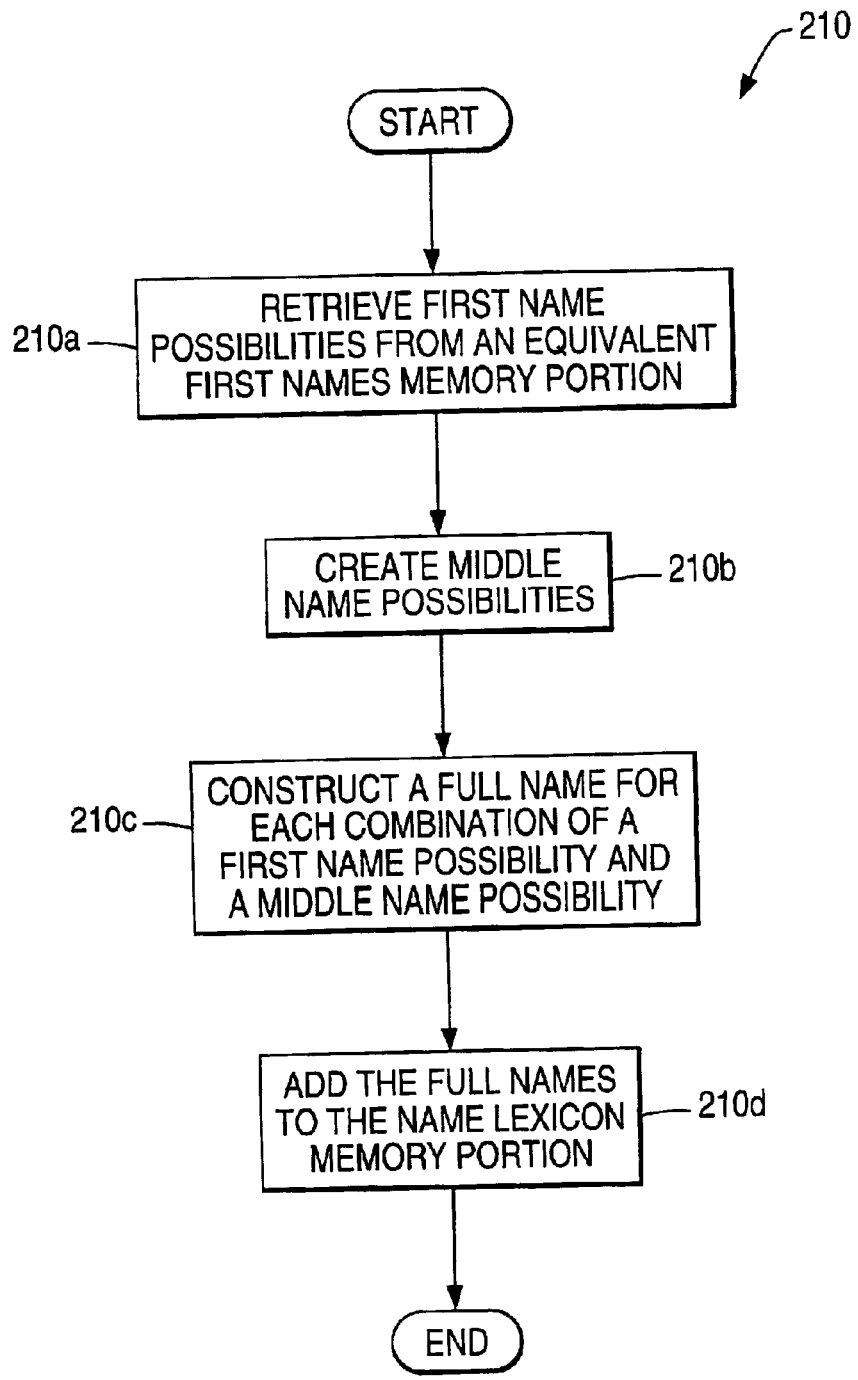
FIG. 6 is a detailed flowchart depicting a program for generating a number of equivalent names based upon a name contained in a name lexicon memory portion associated with the deposit slip item of FIG. 3.

FIG. 6 is a flowchart 210 which depicts a detailed program for step 210 of FIG. 5. More specifically, FIG. 6 depicts one way of generating a number of equivalent names based upon a name contained in the name lexicon memory portion 60 and associated with the deposit slip item 70 of FIG. 3. As shown in step 210a, a number of first name possibilities is retrieved from an equivalent first names memory portion 62 (FIG. 2). In the present example of "James C. Morrison", the first name possibilities retrieved from the memory portion 62 may include "James", "Jim", "J", and "Jimmy". In step 210b, a number of middle name possibilities is created. In the present example, the possibilities may include "C", and a blank (i.e., no middle name). Then, in step 210c, a full name is constructed for each combination of a first name possibility and a middle name possibility. In the present example, the full names constructed in step 210c would include "James Morrison", "James C. Morrison", "J. Morrison", "J. C. Morrison", "Jim Morrison", "Jim C. Morrison", "Jimmy Morrison", and "Jimmy C. Morrison". The full names constructed in step 210c are added to the name lexicon memory portion 60, as shown in step 210d.

It should be apparent that the detailed program in the flowchart 210 of FIG. 6 is one way of generating a number of equivalent names. Other ways of generating equivalent names for storing in the name lexicon memory portion 60 are possible. It should also be apparent that although the above describes the account owner field 72 containing a single account owner name, it is contemplated that the account owner field may contain more than one account owner name. In this case, the different account owner names would need to be separated apart before processing in the manner described hereinabove. Equivalent names would then be generated for each account owner name.

Figure 7:
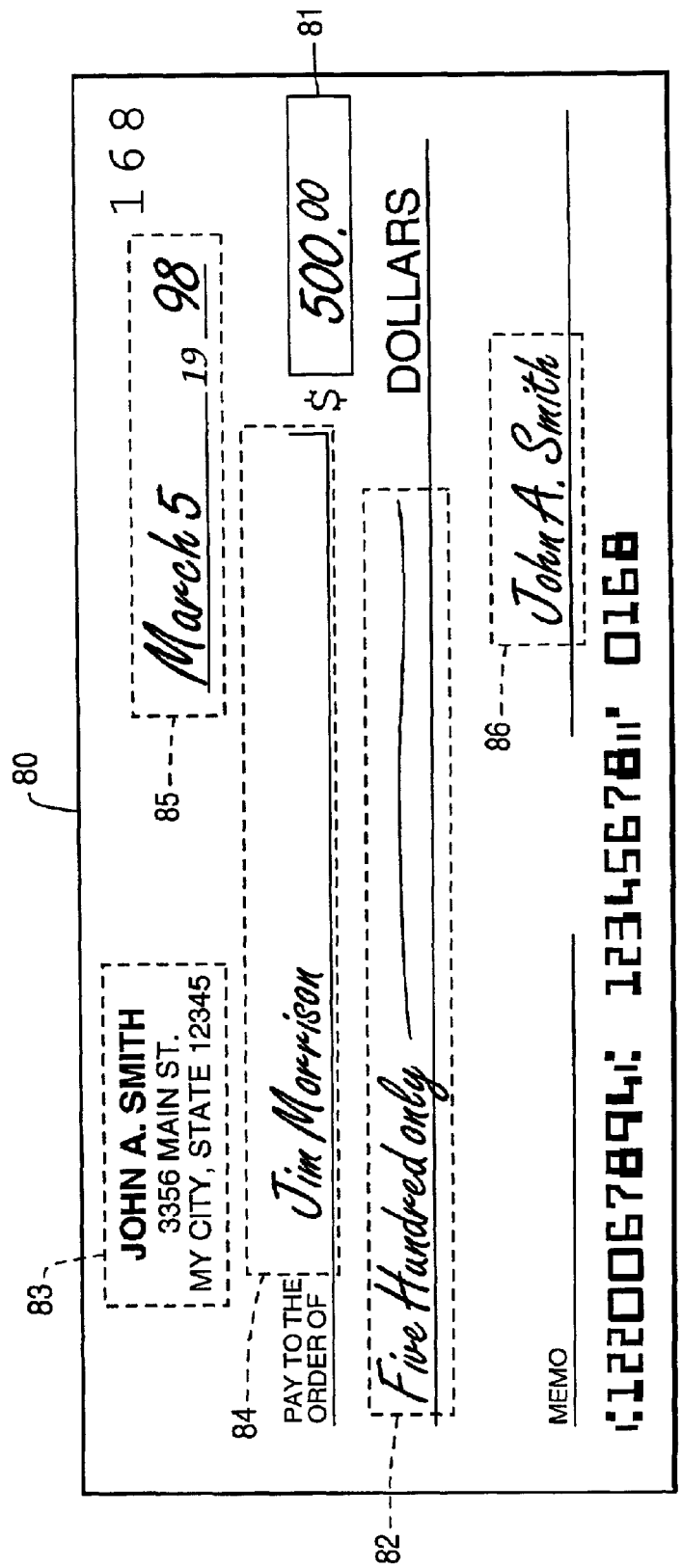
FIG. 7 is an image of a typical check having a payee field which contains a handwritten payee name.

Referring to FIG. 7, an image of a typical check 80 is shown. The check 80 includes a number of fields including a courtesy amount field 81, a legal amount field 82, a payor field 83, a payee field 84, a date field 85, and a signature field 86. The check may be of the personal type or of the business type. As already described hereinabove, the check 80 is moved past the scanner 23 (FIG. 1) to obtain a digitized image of the check. The digitized image of the check is stored in the memory portion (FIG. 2).

Figure 8:
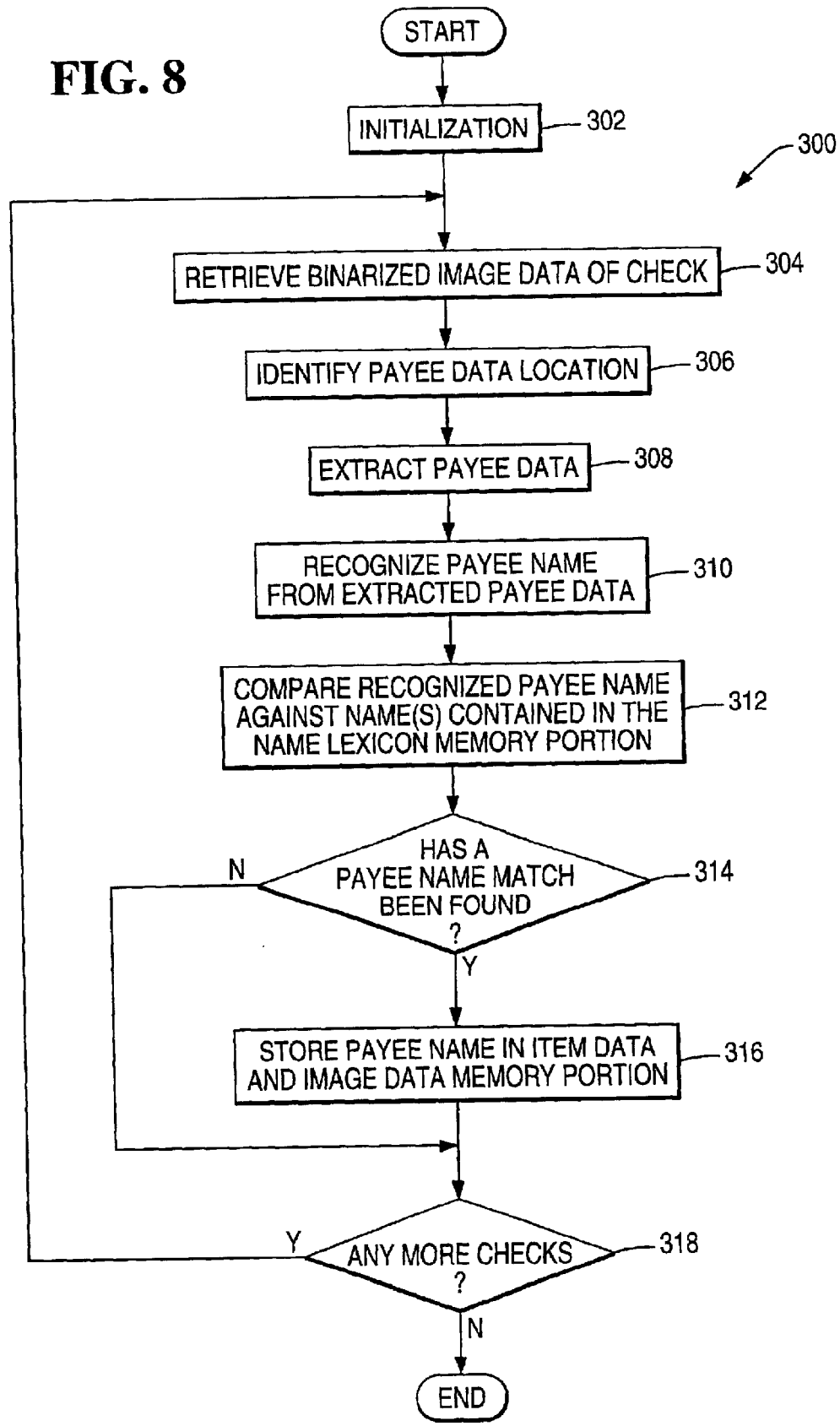
FIG. 8 is a flowchart depicting a program for processing image data associated with the check of FIG. 7.

Referring to FIG. 8, a flowchart 300 depicts a program for processing image data associated with the check 80 of FIG. 7. After program initialization as shown in step 302, the program proceeds to step 304 in which binarized image data associated with the check 80 is retrieved from the item data and image data memory portion 58. The program then proceeds to step 306 in which the location of the payee data is identified. The payee data is then extracted as shown in step 308.

After the payee data is located and extracted, the program proceeds to step 310 in which the extracted payee data from step 308 is subjected to a character recognition engine to establish the name of the payee. There are many character recognition engines available in the marketplace which can be used to establish the name of the payee associated with the check 80 and, therefore, will not be described. In step 312, the recognition results obtained in step 310 are then compared against name(s) contained in the name lexicon memory portion 60 to determine if there is a match, as shown in step 314.

If the determination is step 314 is negative, the program proceeds directly to step 318. However, if the determination in step 314 is affirmative, the program proceeds to step 316 in which the recognized payee name is stored in the item data and image data memory portion 58. The program then proceeds to step 316 in which a determination is made as to whether there are more checks to be processed. If the determination in step 318 is affirmative, the program returns to step 304 to retrieve binarized image data associated with the next check. Otherwise, the program terminates.

A number of advantages result by providing a method of processing items in accordance with the present invention as described above. One advantage is that the chance of either failing to identify a payee name or incorrectly identifying a payee name contained in the payee field of a check is reduced. This results in cost savings and higher productivity of human operators such as bank personnel.

Another advantage is that payee names from checks are more accurately recognized. A relatively higher confidence level in the process of recognizing payee names from checks is achieved. Accordingly, the amount of human operator effort required during check processing is reduced.

It is contemplated that the above-described programs including the name lexicon generator 100 and the equivalent names generator 200 be available on portable storage media, such as a compact disc read only memory (CDROM)). The programs on a CDROM may be installed on different types of item processing systems to provide these systems with corresponding capabilities as described above From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing a non-check item in a check processing system, the method comprising:

(a) capturing an image of the non-check item;

(b) extracting text data from the captured image of step (a);

(c) recognizing a name from the extracted text data of step (b); and (d) storing the recognized name of step (c) in memory to provide an additional entry for a lexicon against which extracted text data from a check item can be compared.

2. A method according to claim 1, wherein the non-check item comprises a deposit slip item.

3. A method according to claim 1, wherein the text data extracted from the captured image of the non-check item comprises account owner data, and the name recognized from the account owner data comprises an account owner name.

4. A method according to claim 3, further comprising the steps of:

(e) generating a number of equivalent account owner names based upon the extracted account owner data of step (b); and (f) storing the equivalent account owner names of step (e) in memory to provide a number of additional entries for the lexicon against which extracted text data from a check item can be compared.

5. A method of processing a deposit slap item in a check processing system, the method comprising the steps of:

(a) capturing an image of the deposit slip item;

(b) extracting account owner data from the captured image of step (a);

c) recognizing an account owner name from the extracted account owner data of step (b); and (d) storing the recognized account owner name of step (c) in memory to provide an additional entry for a lexicon against which extracted payee data from a check item can be compared.

6. A method according to claim 4, further comprising the steps of:

(e) generating a number of equivalent account owner names based upon the extracted account owner data of step (b); and (t) storing the equivalent account owner names of step (e) in memory to provide a number of additional entries for the lexicon against which extracted payee data from a check item can be compared.

7. A check processing apparatus comprising:

means for capturing an image of a non-check item;

means for extracting text data from the captured image;

means for recognizing a name from the extracted text data from the captured image of the non-check item; and means for storing the recognized name of in memory to provide an additional entry for a lexicon against which extracted text data from a check item can be compared.

8. A check processing apparatus according to claim 7, wherein the non-check item comprises a deposit slip item.

9. A check processing apparatus according to claim 7, wherein the text data extracted from the captured image of the non-check item comprises account owner data, and the name recognized from the account owner data comprises an account owner name.

10. A check processing apparatus according to claim 9, further comprising:

means for generating a number of equivalent account owner names based upon the extracted account owner data from the captured image of the non-check item, and means for storing the equivalent account owner names in memory to provide a number of additional entries for the lexicon against which extracted text data from a check item can be compared.

11. A check processing apparatus comprising:

means for capturing an image of a deposit slip item;

means for extracting account owner data from the captured image of the deposit slip item;

means for recognizing an account owner name from the extracted account owner data from the captured image of the deposit slip item; and means for storing the recognized account owner name in memory to provide an additional entry for a lexicon against which extracted payee data from a check item can be compared.

12. A check processing apparatus according to claim 11, further comprising means for generating a number of equivalent account owner names based upon the extracted account owner data from the captured image of the deposit slip item, and means for storing the equivalent account owner names in memory to provide a number of additional entries for the lexicon against which extracted payee data from a check item can be compared.

13. A program storage medium readable by a computer having a memory, the medium tangibly embodying one or more programs of instructions executable by the computer to perform method steps for processing a non-check item in a check processing system, the method comprising the steps of:

(a) capturing an image of the non-check item;

(b) extracting text data from the captured image of step (a);

(c) recognizing a name from the extracted text data of step (b); and (d) storing the recognized name of step (c) in memory to provide an additional entry for a lexicon against which extracted text data from a check item can be compared.

14. A program storage medium according to claim 13, wherein the non-check item comprises a deposit slip item.

15. A program storage medium according to claim 13, wherein the text data extracted from the captured image of the non-check item comprises account owner data, and the name recognized from the account owner data comprises an account owner name.

16. A program storage medium according to claim 15, wherein the method further comprises the steps of:

(e) generating a number of equivalent account owner names based upon the extracted account owner data of step (b); and (f) storing the equivalent account owner names of step (e) in memory to provide a number of additional entries for the lexicon against which extracted text data from a check item can be compared.

17. A program storage medium readable by a computer having a memory, the medium tangibly embodying one or more programs of instructions executable by the computer to perform method steps for processing a deposit slip item in a check processing system, the method comprising the steps of:

(a) capturing an image of the deposit slip item;

(b) extracting account owner data from the captured image of step (a);

(c) recognizing an account owner name from the extracted account owner data of step (b); and (d) storing the recognized account owner name of step (c) in memory to provide an additional entry for a lexicon against which extracted payee data from a check item can be compared.

18. A program storage medium according to claim 17, wherein the method further comprises the steps of:

(e) generating a number of equivalent account owner names based upon the extracted account owner data of step (b); and (f) storing the equivalent account owner names of step (e) in memory to provide a number of additional entries for the lexicon against which extracted payee data from a check item can be compared.

* * * * *

UNITED STATES PATENT AND TRADEMARK OFFICE
CERTIFICATE OF CORRECTION

PATENT NO. : 6,870,947 B2  
DATED : March 22, 2005  
INVENTOR(S) : Kelland, S. B.

Page 1 of 1

It is certified that error appears in the above-identified patent and that said Letters Patent is hereby corrected as shown below:

<u>Column 8,</u>  
Line 25, after "deposit" delete "slap" and insert -- slip --.

Signed and Sealed this

Sixteenth Day of August, 2005

JON W. DUDAS  
*Director of the United States Patent and Trademark Office*